UNITED STATES PATENT OFFICE.

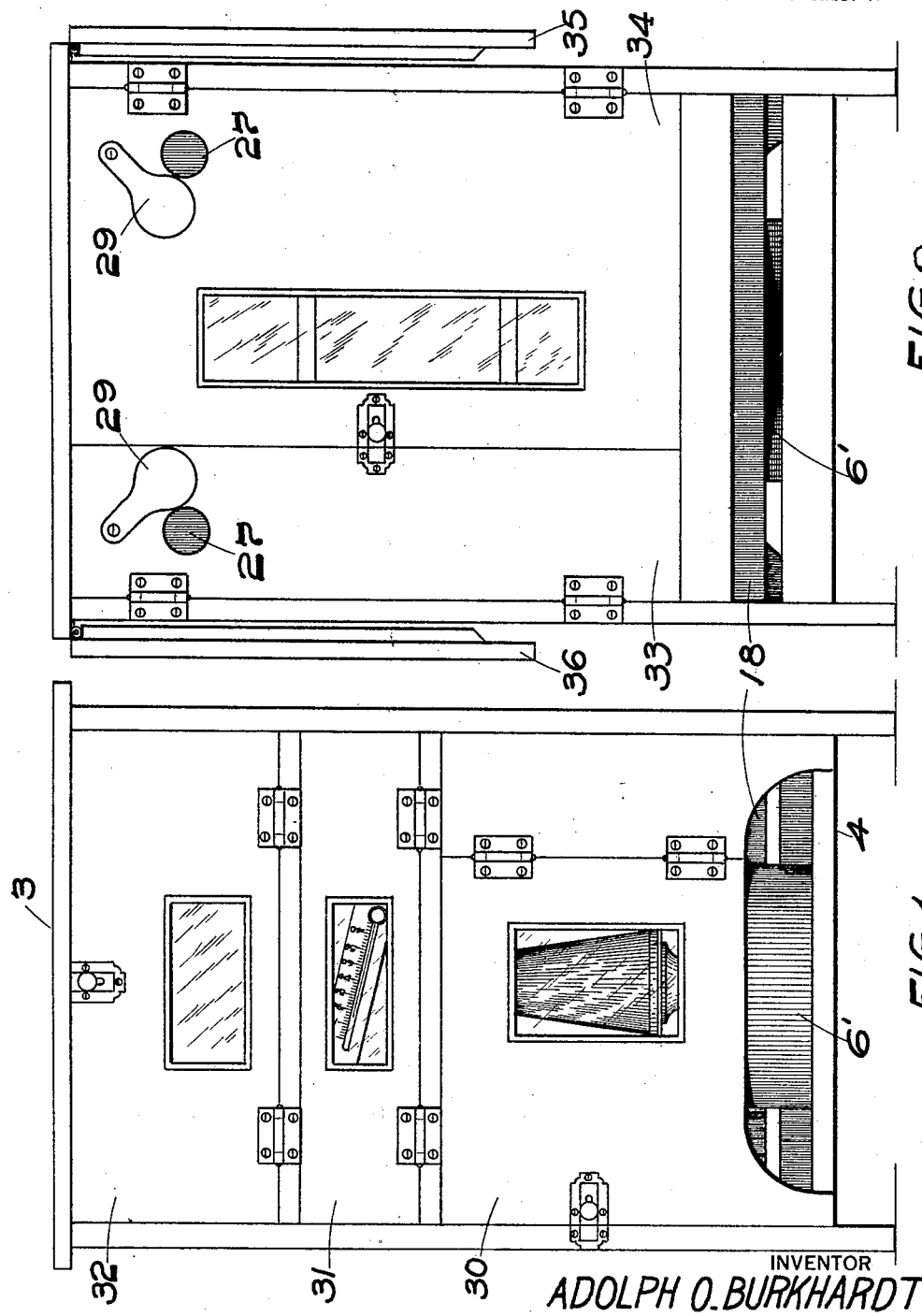

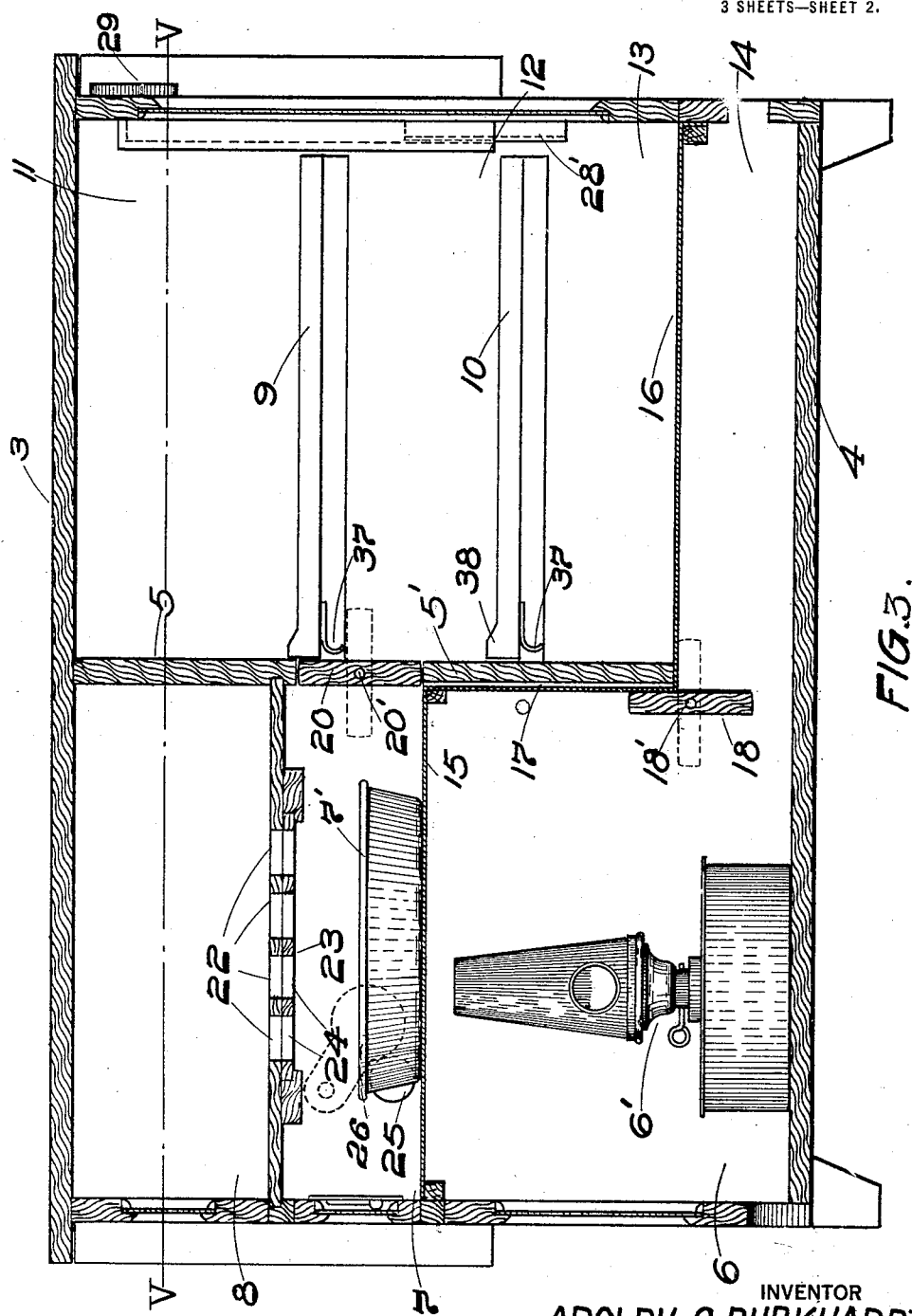

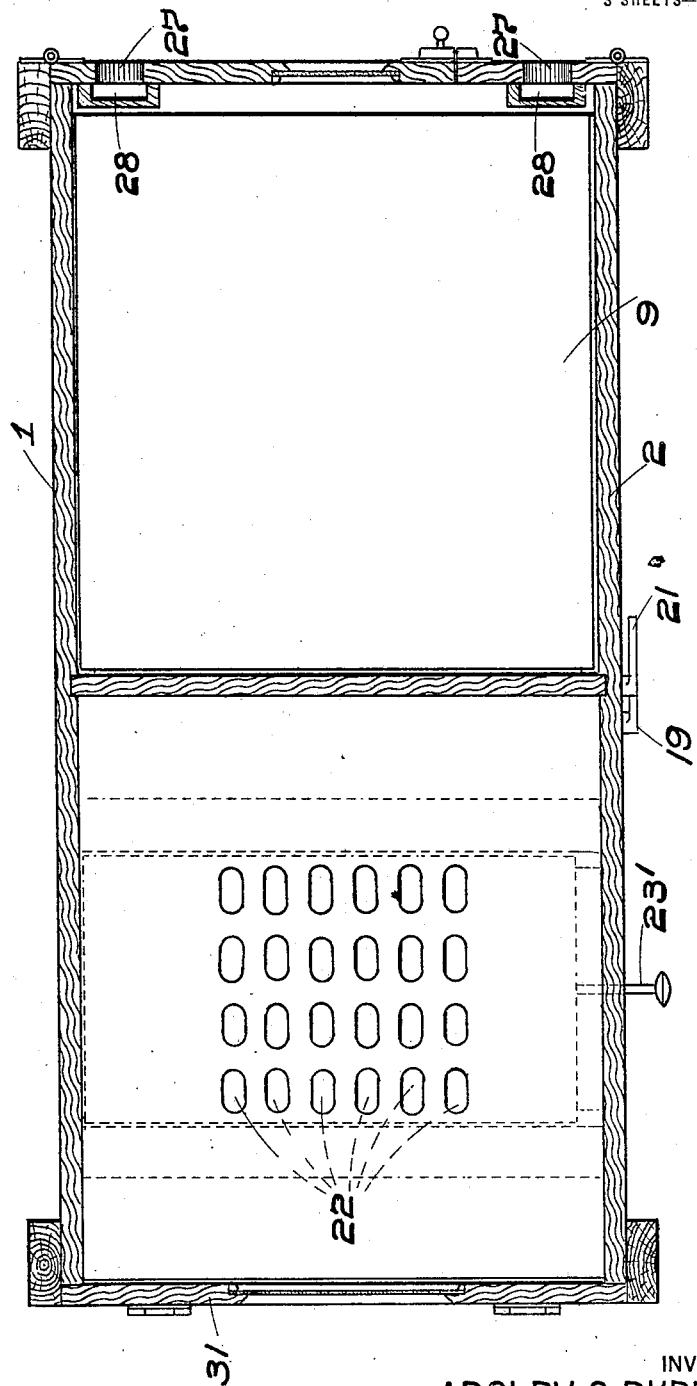

ADOLPH O. BURKHARDT, OF SUGAR CREEK, PENNSYLVANIA.

BREAD-RAISING CABINET.

1,325,506.  Specification of Letters Patent.  Patented Dec. 23, 1919.

Application filed March 22, 1918. Serial No. 223,951.

*To all whom it may concern:*

Be it known that I, ADOLPH O. BURKHARDT, citizen of the United States, residing at Sugar Creek, in the county of Venango and State of Pennsylvania, have invented certain new and useful Improvements in Bread-Raising Cabinets, of which the following is a specification.

The objects, construction, and a general statement of the method of operating or utilizing my improved bread raising cabinet, are herein set forth with sufficient clearness to enable those skilled in the respective arts to which its construction and use relate, to make and use the same.

Objects.

The main object of this invention is, to provide a cabinet equipped with a suitable heating appliance, in which bread-sponge and dough may be placed during the process of bread making, from the first mixing of the sponge and between the several kneading operations of the dough, until it is ready for the baking; said heating apparatus being such that it may, with a minimum amount of fuel and attention, be caused to maintain the proper temperature within said cabinet which is best suited to promote the leavening action of the yeast in the sponge and dough.

A further object of this invention is, to provide a bread-raising cabinet having various compartments adapted to be maintained at different temperatures so that the mass of dough may be divided into several portions, and the leavening action in the respective portions be caused to progress at differing rates of speed, so that said respective portions may be baked *seriatim*, whereby a large baking may be done in a comparatively small oven without in any way impairing the quality or texture of the bread.

Still another object of this invention is, to provide a bread-raising cabinet in which a humidity may be maintained that will not only be most suitable to promote the leavening action of the yeast, but will also prevent an absorption, by the air, of moisture from the dough thus conserving the proper moisture therein, which, for various reasons, produces a bread of a markedly superior quality.

Yet another object of this invention is, to provide a cabinet in which all of the ingredients that are to enter into the bread may, especially in cold weather, be placed at a certain time previous to starting the bread making operation, so that the temperature of all of said ingredients may be caused to have a suitable and uniform temperature which is most conducive to the best results.

A final object of said invention is, to produce a bread-raising cabinet in which the structural material, or at least certain portions thereof, are so arranged and disposed as not only to produce the best results in the bread-raising function of the cabinet, but may, in addition thereto, by re-arrangement or disposition, be made to serve as a piece of kitchen furniture of general utility.

Construction.

The construction whereby I attain said objects is clearly illustrated in the accompanying drawings, which form a part hereof and in which:

Figure 1 is a front elevation,

Fig. 2 is a rear elevation,

Fig. 3 is a central, vertical, longitudinal section,

Fig. 4 is a horizontal section on line V—V of Fig. 3.

The same reference characters are applied to identical parts in all the views.

The structure here shown is substantially the following:

I construct a cabinet of wood or any other suitable material, which is of a general rectangular, oblong shape, and composed of permanent or stationary side-walls 1 and 2, a top 3 and a bottom or floor 4, all of which are substantially plain surfaces, that may be more or less modified, as circumstances may require. A vertically-disposed partition, composed of two portions 5 and 5′, extending transversely of the cabinet and located at or adjacent to the center thereof, divides the cabinet into two substantially equal compartments. Said compartments are subdivided, as and for the respective purposes to be presently set forth, into several vertically-related compartments, as follows:

The front compartment is divided into a heater compartment 6, a vapor compartment 7 and an accelerating chamber 8. The rear compartment of the cabinet, which, as a whole is termed the retarding chamber, is divided by means of horizontally-disposed, removable, shelf-partitions 9 and 10 into a warm chamber 11, an intermediate chamber 12 and a cold chamber 13; below said chamber 13 is a ventilative passage 14, which is, in some instances dispensed with, though this depends upon the conditions of exposure under which the cabinet is to operate.

The upper wall of the heating chamber 6, which is also the floor of the vapor compartment 7, is, preferably, formed of sheet metal as indicated by 15; said floor extends downward along the rear wall 5' of said chamber 6 for a suitable distance, though not to the floor 4, then it is bent at a right angle and extends horizontally to the rear end of the cabinet, thus forming what I term the hearth 16, which is also the upper wall of the ventilative passage 14. Between said wall or partition 5' and the metallic portion 15 is provided a dead-air space 17, or the space between said elements may be filled with suitable insulating material as asbestos.

Between said heater chamber 6 and said ventilative passage 14 is placed a rotative gate or damper 18 which is adapted to occupy either the position shown in full lines or the position shown in dotted lines for the purpose of affording more or less ventilation or circulation of air between the respective chambers with which it communicates. To the pivot 18' of this gate or damper is attached a manipulating device 19, whereby said gate is adapted to be operated from the exterior of the cabinet.

Between the vapor chamber and the retarding chamber is placed a gate or damper 20, which is adapted to occupy either the position shown in full lines, or the position shown in dotted lines, whereby more or less circulation of air is provided for between the respective chambers between which said gate 20 is interposed; to the pivot 20' of this gate is attached a manipulating device 21, adapted for the manipulation of said gate from the exterior of the cabinet.

The floor of said accelerating chamber 8 is provided with a register which is produced by forming the holes 22 in said floor and placing beneath the perforated portion so formed, a perforated slide or plate 23 having the perforations 24 which are identical in size and spacing with the perforations 22, so that they may be placed in register or coincidence therewith, thus affording a free, direct passage for air from said vapor chamber into said accelerating chamber: Also said slide or plate 23 may be so moved and positioned that said perforations 22 and 24 will be out of register, thereby preventing the direct passage of air from said vapor chamber, into said accelerating chamber. A suitable stem, as 23' is attached to said slide 23 for the purpose of actuating the same.

One or more ventilative openings, as 25, are provided in each side of the vapor chamber, or through the walls thereof, each of which is controlled by a gate or damper, as 26.

One or more ventilative openings, as 27, are provided through the wall of the upper compartment of the retarding chamber, and a downwardly-extending duct 28 communicates therewith which duct has an opening at its bottom, as indicated in Figs. 3 and 4. I preferably provide said duct with a vertically-adjustable portion 28' whereby the lower opening of said duct may be positioned higher or lower as the particular requirements of the service in which the cabinet is employed may indicate.

Any suitable heat-generating device, as a lamp 6' is employed in the heater chamber for the purpose of generating the required heat, to promote the proper leavening action of the yeast.

A suitable container for water, as 7', is placed in the moisture chamber, for the purpose of imparting a suitable state of humidity to the air within the cabinet.

The various compartments are each provided with suitable doors,—the door for the heater chamber being indicated by the reference numeral 30, that for the vapor chamber being indicated by the reference numeral 31, and that for the accelerating chamber by the reference numeral 32. The retarding chamber is preferably provided with two doors 33 and 34. All of said doors may be, and preferably are, provided with glass-closed openings, as shown, for the purpose of permitting an inspection of the contents of each compartment without opening the door thereof.

The cabinet is preferably provided with drop leaves 35 and 36 the main purpose of which is to furnish a supplementary wall for the otherwise exposed sides of the cabinet whereby the radiation of heat therefrom is materially lessened, and an even and suitable temperature within the cabinet is more easily and cheaply maintained. An additional object of said leaves is to cause the cabinet to be more adaptable and convenient for use as a kitchen table, the area of the top being considerably increased when said leaves are raised.

For the purpose of further broadening the utility of my cabinet, the partition shelves 9 and 10 are made removable and suitable for use as molding boards upon which to knead bread or any other bread-products or pastry. The underside of each shelf, adjacent to one edge thereof, is provided with hooks 37, adapted to engage the edge of the table top adjacent to the operator for the purpose of preventing the board from slipping or moving upon the table, especially in a direction away from the operator, that being the direction in which the greatest pressure is usually exerted in kneading dough or upon a rolling-pin. A bead 38 is also provided upon the edge of the board to prevent the rolling-pin from rolling off the board The sponge, and the dough in the mass—before it has been divided into loaves and placed in the baking pans—is usually placed in the retarding chamber, and on account of the various shapes of containers which may be used for sponge, it is desirable that the shelves of this chamber be adapted for removal and re-arrangement. Many bread-makers prefer to use a bread-mixer for the sponge and since these mixers are comparatively high, it is necessary to remove one or both of the shelves 9 and 10 in order to provide room for them. In case however, a large pan is used for the sponge there is room enough in either of the chambers 11, 12 or 13 to receive it. When it is necessary to remove said shelves from their usual supports, they are usually placed upon the hearth 16.

In some cases it may not be necessary to extend the floor 4 beyond the heating chamber 6, and the cabinet may be so constructed, if desired.

My cabinet is as well adapted to outdoor and camp service as household service, and, as previously stated, the conditions of exposure or protection from the surrounding atmosphere will determine the selection of certain details of construction.

By a proper adjustment of the various dampers 18, 20, 26 and 29, temperatures may be produced in the various chambers or compartments of my cabinet ranging,—for illustration—from 65° in the cold chamber 13 to 90° in the accelerating chamber 8. When the bread sponge is to be permitted to rise over night, one of the compartments of the retarding chamber, (or the whole chamber if the shelves are removed) is brought to a temperature of approximately 70°, and the flame of the lamp 6', together with the various dampers, are all adjusted to maintain approximately this temperature over night. The sponge is then placed in said compartment where it is to remain over night. In the morning the sponge is mixed into dough, in the usual way, and the mass of dough may then be permitted to rise in any one of the compartments which is most suitable, as to temperature. The temperature of the accelerating chamber is usually too high, however, for dough in the mass. When the dough mass has arrived at the proper stage, it is divided into loaves, in the usual way, and placed in the baking pans. Now, if the capacity or size of the oven is such as to contain all the bread, and all of the loaves can be baked at the same time, they should all be placed in the accelerating chamber 8, and thus all be brought simultaneously to the suitable stage for baking; when this stage has been reached, they will all be placed in the oven to bake. If however, it is desired to bake more bread than the oven used will contain, and the bread must, upon that account, be baked in two or three lots, one after the other, then, when the dough mass is separated into loaves and is in the pans, it is divided into lots, according to the capacity of the oven. The lot which is to be baked first, should be placed in the accelerating chamber 8, where it will be brought in the minimum period of time to the condition suitable for baking. Lot 2 should be placed in one of the compartments of the retarding chamber,—usually the intermediate chamber 12, where it will be brought to a suitable baking condition at about the time lot 1 is ready to be removed from the oven; in case there is a third lot, this should be placed in the cold chamber 13, where it will be brought to proper baking condition at about the time lot 2 is removed from the oven.

From the foregoing it will be readily seen that my improved bread-raising cabinet differs from all others in the provision of the chambers of respectively differing temperatures, whereby a two or three-oven quantity of dough may be properly cared for, and the two or three lots into which it is divided be brought to suitable baking condition progressively, one after the other, and the quality of the dough will not be impaired by reason of the respectively differing periods at which the lots are placed in the baking oven.

This is a desirable feature, and fills a long-felt want.

I claim the following:

1. A bread-raising cabinet consisting of an oblong, rectangular structure, having the longitudinal dimensions of the interior portion thereof divided into two substantially equal portions by a vertically disposed partition the space upon one side of said partition being divided into three vertically related compartments which are designated respectively as, a heater compartment, a vapor compartment and an accelerating compartment; the space upon the other side of said partition being a single chamber, removable, horizontally-disposed partitions arrangeable and adapted to divide said last mentioned chamber into vertically-related compartments; a heating appliance in said heater chamber, means operable to control the distribution of heat from said heating appliance to the chambers adjacent thereto and to cause said chambers to be maintained at relatively differing temperatures and means adapted to impart humidity to the air within said cabinet.

2. A bread-raising cabinet consisting of an oblong rectangular structure forming a substantially inclosed chamber, a vertically-disposed, transverse partition dividing the interior of said cabinet into two substantially equal compartments, horizontally-disposed partitions dividing one of said compartments into three chambers, termed respectively, a heater chamber, a vapor chamber and an accelerating chamber, a heat-generating appliance in said heater chamber, a humidifying appliance in said vapor chamber; the other of said compartments being adapted to comprise either a single chamber or a plurality of vertically related chambers, removable partitions adapted to form said plurality of chambers, ventilative openings within the wall of said cabinet, controlling means for said openings, and gates, operable to control the distribution of heat within said cabinet, so as to cause said plurality of chambers to have a differing temperature, each from the others.

3. A bread-raising cabinet comprising a rectangular chamber having suitable inclosing walls, movable supplementary walls adapted to supplement a portion of said inclosing walls for the purpose set forth, a vertically-extending partition within said chamber dividing the same into two compartments, one of said compartments being divided into three vertically-related chambers, the lowermost of which is termed the heating chamber, the intermediate one the vapor chamber and the uppermost the accelerating chamber, a metallic partition between said heater chamber and said vapor chamber, a partition between said vapor chamber and said accelerating chamber having as features thereof, openings through the same, a slide having corresponding openings therein, adapted to be placed in registry with, and to close said first-mentioned openings, door-controlled openings for said chambers, a heat-generating appliance in said heater chamber, a humidifier in said vapor chamber; the compartment upon the other side of said vertically-disposed partition, which is termed the retarding compartment, being normally a single compartment, adapted for the reception of removable partitions arrangeable so as to divide said compartment into vertically-related chambers, partitions adapted to so divide said compartment, a door-controlled opening for said retarding chamber, and a damper-controlled opening between said vapor-chamber and said retarding chamber.

4. A bread-raising cabinet comprising in combination, a rectangular chamber, suitable inclosing walls for said chamber, a vertically-disposed partition within said chamber dividing the same into two compartments, one of said compartments being divided into three vertically-related chambers, namely, a lower heating chamber, a central vapor chamber, and an upper accelerating chamber, a metallic partition between said heater chamber and said vapor chamber, a perforated partition between said vapor chamber and said accelerating chamber, means operative to close said perforations, door-controlled openings for said chambers, a heat-generating appliance in said heating chamber, a humidifier in said vapor chamber; the compartment upon the other side of said vertically-disposed partition, termed the retarding chamber being normally a single compartment arranged for the reception of removable partitions, removable partitions arranged to divide said compartment into vertically related chambers, means for controlling the distribution of heat from said heat-generating means so as to cause said plurality of chambers to have relatively differing temperatures, each from the others, a door controlled opening for said retarding chamber, a damper-controlled opening between said vapor chamber and said retarding chamber, and a vertically-adjustable ventilative opening for said retarding chamber.

In testimony whereof I affix my signature in presence of two witnesses.

ADOLPH O. BURKHARDT.

Witnesses:
JOHN L. NESBIT,
MARGARET S. MARTIN.